United States Patent [19]
Kurti

[11] 3,713,752
[45] Jan. 30, 1973

[54] COMPOSITE BLADE FOR A GAS TURBINE ENGINE

[75] Inventor: Alexander Kurti, West Hartford, Conn.

[73] Assignee: United Aircraft Corporation, East Hartford, Conn.

[22] Filed: Oct. 28, 1971

[21] Appl. No.: 193,244

[52] U.S. Cl. ................... 416/219, 416/230, 416/241
[51] Int. Cl. .............................................. F01d 5/14
[58] Field of Search .............. 416/219-221, 229-230, 416/241 A

[56] References Cited

UNITED STATES PATENTS 3,487,879  1/1970  McCarthy et al. ................ 416/230 X
3,600,103  8/1971  Gray et al. ........................ 416/230 X Primary Examiner—Everette A. Powell, Jr.
Attorney—John D. Delponti

[57] ABSTRACT

A composite fluid-directing element comprises a laminated, filament reinforced fluid-directing blade having a cambered airfoil portion and a sinusoid root portion and a foot member bonded to the root portion and configured for retention in the undercut slot of a turbomachine body. The blade is formed of a plurality of parallel laminations of sheets including sheets of high modulus, high strength reinforcing filaments embedded in a matrix material and aligned in a spanwise direction. The foot member has a radially extending oscillatory wave form opening conforming to the shape of the blade root portion in which the root portion is received in bonded relation.

6 Claims, 2 Drawing Figures

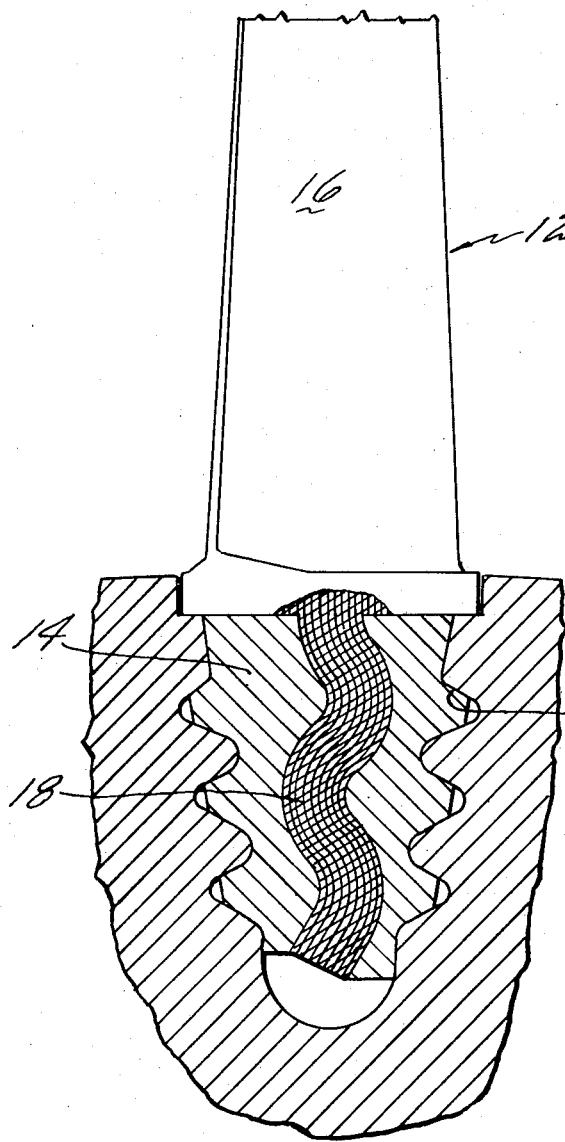
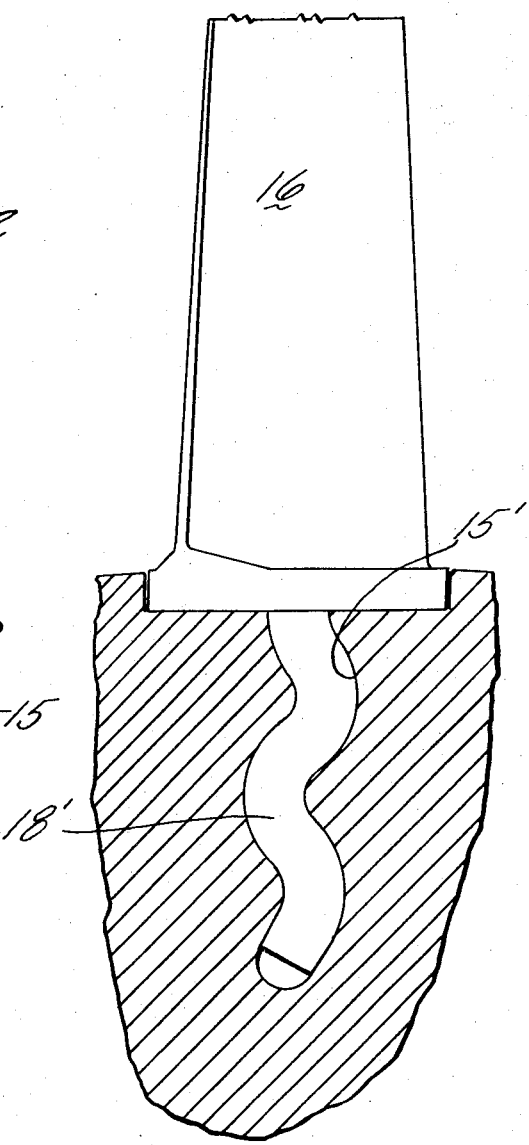

3,713,752

COMPOSITE BLADE FOR A GAS TURBINE ENGINE

BACKGROUND OF THE INVENTION

The invention relates to a composite blade adapted for use in a fluid flow machine such as a gas turbine engine. More particularly, it relates to a composite filament reinforced blade having a root portion adapted for mounting in the undercut slot of a turbomachine body.

It is known to utilize filaments in the reinforcement of gas turbine engine components such as compressor blades. The potential for usage of high modulus, high strength nonductile filaments, such as silicon carbide, carbon, boron or boron with a thin protective coating of, for example, silicon carbide in a resin or metal matrix particularly carbon in an epoxy matrix, is widely recognized.

One of the basic problems in utilizing filamentary reinforcements in blade structures, particularly in the smaller blades, resides in the means for mounting them in their rotor or stator structure. Typically, a compressor blade requires an enlarged base formed for insertion in the compressor rotor or stator. While the satisfaction of such a requirement in the normal metal blade is difficult from a manufacturing standpoint, as well as expensive, it is accepted as being commercially feasible. Satisfaction of the requirement in a filament reinforced composite has however, been extremely difficult, primarily because of the composite's inherent sensitivity to stresses in the blade root area which act locally either in compression or in shear or both.

In one arrangement, as disclosed in copending application Ser. No. 95,232 by H. Stargardter filed Dec. 4, 1970 and assigned to the present assignee, it has been found advantageous to form the blade as a plurality of substantially parallel elongated laminations disposed in a stack one on the other, the laminations including elongated sheets of unidirectional reinforcing filaments embedded in a matrix material and aligned in a spanwise direction with the lower end of the stack having its laminations splayed outwardly with metallic inserts bonded therebetween to form an enlarged root portion extending chordwise of the blade.

In other arrangements wherein the laminations are not splayed outwardly, various disadvantages have been apparent. One of the primary problems resides in the lack of uniformity of load distribution in the filament reinforced layer sheets. When dealing for example with a nondivergent, uncurved root portion clamped between supporting foot sections, an extremely high clamping force is needed otherwise the bulk of the tensile load is carried by the filaments in the outer sheet layers. Where the nondivergent root portion is curved in a single arc, such as where the filaments are looped around a pin, the shorter length filaments on the inside of the loop carry the preponderance of the load.

SUMMARY OF THE INVENTION

The present invention contemplates a composite fluid-directing element having a foot portion engageable for retention in the undercut slots of a turbomachine body. More particularly, the invention encompasses a fluid-directing element including a laminated, filament reinforced fluid-directing blade having an airfoil portion and a root portion, the blade being formed from a plurality of parallel laminations of sheets including sheets of high modulus, high strength aligned reinforcing filaments embedded in a matrix material and extending in a generally spanwise direction from the tip of the blade through the root portion thereof.

In brief, the present invention centers on the idea of configuring the root portion of a filament reinforced blade as a radially extending oscillatory wave form which is preferably bonded to discrete foot member means shaped for retention in the undercut slot of the turbomachine body, although it is envisioned, as explained hereinafter, that such foot member means may be eliminated. The wave form shape provides means for uniformly distributing loads as well as for decreasing the bending radii of successive bends making up the wave form to provide better footing and a relatively constant total stress capacity. The provision of a sinusoidal type root portion acts to dissipate tensile stress in the filaments as they pass around a curved surface and, since the total stress which a given filament can withstand is known and is comprised, in essence, of only two components, i.e., tensile stress and bending stress, the amount of bending stress allowable increases as the tensile stress is dissipated. The maximum amount of bending stress allowable at a given point along a filament is thus ascertained and utilized to control the minimum bending radii in the wave form.

Tensile stress dissipation results according to the known formula:

$$t_1/t_2 = e^{f\alpha} \quad (1)$$

where $t_1$ is the tension in the filament before passage around the surface, $t_2$ is the tension in the filament after passage, $f$ is the coefficient of friction and $\alpha$, expressed in radians, is the length of the filament in contact with the surface.

Minimum bending radius, $\rho$, at a given point along any filament is ascertained from the known formula:

$$\rho = (E \times c)/S_b \quad (2)$$

where E is the modulus of elasticity, $c$ is the radius of the filament and $S_b$ is the maximum bending stress allowable.

By virtue of the present invention, a filament reinforced blade is provided wherein the combination of the tensile and bending stresses remains relatively constant while tensile stress is being dissipated.

BRIEF DESCRIPTION OF THE DRAWINGS

An understanding of the invention will become more apparent to those skilled in the art by reference to the following detailed description when viewed in light of the accompanying drawings wherein:

FIG. 1 is a fragmentary sectional view with parts in elevation of a filament reinforced composite blade including foot member means; and FIG. 2 is the same without the foot member means.

DESCRIPTION OF THE PREFERRED EMBODIMENT

In the drawing is shown a fluid-directing element 16 having a blade member 12 and a foot member 14 bonded thereto adapted for mounting in the undercut slot 15 of a turbomachine body. The blade member is comprised of a plurality of laminations which are bonded together in a stack. Each lamination is itself comprised of a plurality of sheets of unidirectional reinforcing filaments embedded in a matrix material and aligned in the spanwise direction. Each sheet is preferably a monolayer tape of high strength, high modulus, nonductile filament such as those made of boron, or other materials as indicated hereinbefore, and embedded in a suitable matrix, such as the high temperature resins, as for example polyimide, polybenzimidazole, polybenzothiozole, polyoxadiazole and the like, the lower temperature resins, as for example epoxy, polyester, phenolic, acrylic and the like, or metals such as aluminum, magnesium, titanium, and their alloys and the like.

In general the filaments are of a material having a modulus of elasticity of at least about $25 \times 10^6$ psi. Further, while each thin sheet layer of the parallel high modulus, high strength filaments and matrix need not be directionally aligned in a spanwise direction, the majority are so oriented in order to stiffen the blade in the direction of its longitudinal axis and substantially increase the bending modal frequency to a level above that of the operating frequencies to be encountered. Some of the sheet layers may be arranged at different angles with regard to the blade longitudinal axis to increase the torsional modal frequency of the blade. As will be appreciated by those skilled in the art, the orientation and combination of layers may be varied in order to meet the requirements of the particular blade design.

The blade member 12 is comprised of a cambered airfoil portion 16 and a sinuous root portion 18 which may be described as having an oscillatory wave form. The bending radii R may be equal as shown, or they may diminish progressively in a tip-to-root direction, but in either case, the minimum bending radius $\rho$ allowable at any given point along the filament is ascertained according to the above formula (2):

$$\rho = Ec/S_b$$

where E is the modulus of elasticity, c is the distance of the surface of each fiber from its neutral axis (i.e., the radius of the filament) and $S_b$ is the maximum bending stress allowable. In other words, and as will be appreciated, the minimum bending radius in the root section will vary according to requirements, but may be characterized as the smallest radius over which the particular filament may be bent elastically while still retaining sufficient strength to withstand on a continuing basis, normal expected operational tensile loads.

The foot member 14 is preferably formed in two pieces, each piece having an inner surface conforming with and bonded to the root portion surface with which it is allied and an outer surface of conventional design, such as the fir tree configuration shown. It will be recognized however, that the foot member 14 may be formed as a single piece having a slot or opening which conforms in shape to the root portion 18. It will further be recognized, as shown in FIG. 2, that the foot member 14 may be omitted entirely if the turbomachine body slot 15' itself conforms to the sinuous shape of the root portion 18'.

It is to be understood that various modifications can be made without departing from the spirit of the present invention. What has been set forth above is intended primarily as exemplary to enable those skilled in the art in the practice of the invention and it should therefore be understood that within the scope of the appended claims, the invention may be practiced in other ways than as specifically described.

What is claimed is:

1. A composite fluid-directing element for mounting on a body of a turbomachine having undercut slots comprising a laminated, filament reinforced fluid-directing blade member having a cambered airfoil portion and a sinusoid root portion, said blade member being formed from a plurality of parallel laminations of sheets including sheets of high modulus, high strength reinforcing filaments embedded in a matrix material and aligned in a spanwise direction, said root portion having a radially extending oscillatory wave form and said blade being adapted for mounting on said body with the airfoil portion extending spanwise of the blade from the slot and the slot extending chordwise of the blade at the root portion thereof.

2. The invention of claim 1 wherein said element further includes a foot member bonded to said root portion and configured for retention in said undercut slot in the turbomachine body, said foot member having a radially extending oscillatory wave form opening conforming to the shape of the root portion of said blade member receiving said root portion therein.

3. The invention of claim 2 wherein said filaments are selected from the group consisting of silicon carbide, carbon, boron and silicon carbide coated boron.

4. The invention of claim 3 wherein said sinusoid root portion is in the form of a succession of radially extending waves whose bending radii are equal.

5. The invention of claim 3 wherein said sinusoid root portion is in the form of a succession of radially inwardly extending waves whose bending radii are progressively diminished.

6. A composite fluid-directing element for mounting on a turbomachine body comprising a laminated, filament reinforced blade member having an airfoil portion and a root portion integral with said airfoil portion, said blade member being formed from a plurality of bonded sheets of high modulus, high strength parallel reinforcing filaments embedded in a matrix material and extending from the tip of said airfoil portion through said root portion, said root portion having a radially extending oscillatory wave form whose minimum bending radius $\rho$ is limited by the formula:

$$\rho = Ec/S_b$$

where $S_b$ is the amount of bending stress allowable to meet operational loads, E is the modulus of elasticity of the filament and c is the radius of the filament.

* * * * *